United States Patent
Stanczak et al.

(10) Patent No.: US 12,432,629 B2
(45) Date of Patent: Sep. 30, 2025

(54) LINK RECOVERY VIA CELLS PREPARED WITH INFORMATION FOR HANDOVERS INCLUDING CHO AND DAPS

(71) Applicant: Nokia Technologies Oy, Espoo (FI)

(72) Inventors: Jedrzej Stanczak, Wroclaw (PL); Srinivasan Selvaganapathy, Bangalore (IN); Ahmad Awada, Munich (DE)

(73) Assignee: Nokia Technologies Oy, Espoo (FI)

( * ) Notice: Subject to any disclaimer, the term of this patent is extended or adjusted under 35 U.S.C. 154(b) by 474 days.

(21) Appl. No.: 18/003,987

(22) PCT Filed: Jun. 28, 2021

(86) PCT No.: PCT/FI2021/050497
§ 371 (c)(1),
(2) Date: Dec. 30, 2022

(87) PCT Pub. No.: WO2022/029368
PCT Pub. Date: Feb. 10, 2022

(65) Prior Publication Data
US 2023/0262545 A1    Aug. 17, 2023

(30) Foreign Application Priority Data
Aug. 7, 2020  (IN) .............................. 202041033960

(51) Int. Cl.
*H04W 36/00*    (2009.01)
*H04W 36/18*    (2009.01)
(Continued)

(52) U.S. Cl.
CPC .  *H04W 36/0079* (2018.08); *H04W 36/00835* (2018.08); *H04W 36/305* (2018.08); *H04W 36/362* (2023.05); *H04W 36/185* (2023.05)

(58) Field of Classification Search
CPC ....... H04W 36/0079; H04W 36/00835; H04W 36/305; H04W 36/362; H04W 36/185
See application file for complete search history.

(56) References Cited

U.S. PATENT DOCUMENTS

| 2021/0105690 | A1* | 4/2021 | Wu | .................. H04W 36/0083 |
| 2022/0330125 | A1* | 10/2022 | Ishii | ..................... H04W 36/36 |
| 2023/0113810 | A1* | 4/2023 | You | ..................... H04W 36/305 |
| | | | | 370/331 |

FOREIGN PATENT DOCUMENTS

| CN | 112042224 A | 12/2020 | |
| WO | WO-2021056453 A1 * | 4/2021 | ........ H04W 36/0055 |
| WO | 2021/089698 A1 | 5/2021 | |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

(Continued)

*Primary Examiner* — Anthony S Addy
*Assistant Examiner* — Jason Utley
(74) *Attorney, Agent, or Firm* — Barta Jones, PLLC

(57) ABSTRACT

A UE receives configuration from a source cell for conditional handover for target cell(s). At least one of the target cell(s) also supports DAPS handover. The UE determines that either a RLF or HOF has occurred. The UE selects one of the target cell(s) for a handover, and performs a process for handover to the selected target cell. A UE receives individual handover commands and corresponding configuration for conditional handover for target cell(s) and an indication to use DAPS handover if possible in response to a handover. The UE determined condition(s) for handover to one of the target cell(s) have triggered, wherein the one target cell supports DAPS handover. The UE performs, (Continued)

based on the indication to use DAPS handover if possible in response to a handover, handover by the user equipment to the one target cell without releasing the source cell while accessing the one target cell.

3 Claims, 9 Drawing Sheets

(51) Int. Cl.
 *H04W 36/30* (2009.01)
 *H04W 36/36* (2009.01)

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.1.0, Mar. 2020, pp. 1-386.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334,.

International Search Report and Written Opinion received for corresponding Patent Cooperation Treaty Application No. PCT/FI2021/050497, dated Nov. 2, 2021, 13 pages.

"On RLF reporting for CHO and DAPS", 3GPP TSG-RAN WG2 Meeting #108, R2-1915497, Agenda: 6.9.3.2, Nokia, Nov. 18-22, 2019, 3 pages.

"Consideration on CHO De-configuration and Failure", 3GPP TSG-RAN WG2 Meeting #105bis, R2-1905098, Agenda: 12.3.3.1, LG Electronics Inc, Apr. 8-12, 2019, pp. 1-3.

\* cited by examiner

LINK RECOVERY VIA CELLS PREPARED WITH INFORMATION FOR HANDOVERS INCLUDING CHO AND DAPS

RELATED APPLICATION

This application was originally filed as PCT Application No. PCT/FI2021/050497, filed on 28 Jun. 2021, which claims priority from Indian Provisional Application No. 202041033960, filed on 7 Aug. 2020, each of which is incorporated herein by reference in its entirety.

TECHNICAL FIELD

Exemplary embodiments herein relate generally to cellular and mobile communication systems such as new radio (NR) and Long Term Evolution (LTE) and, more specifically, relate to handovers such as a so-called "conditional handover" (CHO) and Dual Active Protocol Stack (DAPS) handover which have been specified for NR and LTE.

BACKGROUND

In cellular and mobile communication systems, such as new radio (NR) and Long Term Evolution (LTE), a User Equipment (UE) is a wireless, typically mobile device that connects to the wireless network via base stations. There are times when a UE has to transfer from one base station to another, such as when the UE is moving out of range of a first base station and into range of a second base station. The process for transferring a UE from one base station to another is referred to as a handover.

Certain of these handovers include so-called "conditional handovers" (CHOs) and Dual Active Protocol Stack (DAPS) handovers, which have been specified for NR and LTE in Release (Rel.) 16. CHO aims at improving mobility robustness by reducing the number of radio link failures (RLFs) or handover failures (HOFs), whereas DAPS reduces the interruption time close to 0 ms (zero millisecond) in Downlink (DL) and Uplink (UL) during a handover.

There are still issues with handovers such as CHOs and DAPS handovers.

BRIEF SUMMARY

This section is intended to include examples and is not intended to be limiting.

In an exemplary embodiment, a method is disclosed that includes receiving, by a user equipment and from a source cell, configuration for conditional handover for one or more target cells. At least one of the one or more target cells also supports dual active protocol stack handover. The method includes determining by the user equipment that one of a radio link failure or a handover failure has occurred. The method further includes selecting by the user equipment, using at least the configuration, one of the one or more target cells for a handover, and performing a process for handover to the selected target cell.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receive, by a user equipment and from a source cell, configuration for conditional handover for one or more target cells, wherein at least one of the one or more target cells also supports dual active protocol stack handover; determine by the user equipment that one of a radio link failure or a handover failure has occurred; select by the user equipment, using at least the configuration, one of the one or more target cells for a handover; and perform a process for handover to the selected target cell.

An exemplary computer program product includes a computer-readable storage medium bearing computer program code embodied therein for use with a computer. The computer program code includes: code for receiving, by a user equipment and from a source cell, configuration for conditional handover for one or more target cells, wherein at least one of the one or more target cells also supports dual active protocol stack handover; code for determining by the user equipment that one of a radio link failure or a handover failure has occurred; code for selecting by the user equipment, using at least the configuration, one of the one or more target cells for a handover; and code for performing a process for handover to the selected target cell.

In another exemplary embodiment, an apparatus comprises means for performing: receiving, by a user equipment and from a source cell, configuration for conditional handover for one or more target cells, wherein at least one of the one or more target cells also supports dual active protocol stack handover; determining by the user equipment that one of a radio link failure or a handover failure has occurred; selecting by the user equipment, using at least the configuration, one of the one or more target cells for a handover; and performing a process for handover to the selected target cell.

In an exemplary embodiment, a method is disclosed that includes receiving, by a user equipment and from a source cell, individual handover commands and corresponding configuration for conditional handover for one or more target cells and an indication to use dual active protocol stack handover if possible in response to a handover. At least one of the target cells also supports the dual active protocol stack handover. The method includes determining by the user equipment that one or more conditions for handover to one of the one or more target cells have triggered, wherein the one target cell supports dual active protocol stack handover. The method further includes performing, based on the indication to use dual active protocol stack handover if possible in response to a handover, handover by the user equipment to the one target cell without releasing the source cell while accessing the one target cell.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receive, by a user equipment and from a source cell, individual handover commands and corresponding configuration for conditional handover for one or more target cells and an indication to use dual active protocol stack handover if possible in response to a handover, wherein at least one of the target cells also supports the dual active protocol stack handover; determine by the user equipment that one or more conditions for handover to one of the one or more target cells have triggered, wherein the one target cell supports dual active protocol stack handover; and perform, based on the indication to use dual active protocol stack handover if possible in response to a handover, handover by the user equipment to the one target cell without releasing the source cell while accessing the one target cell.

An exemplary computer program product includes a computer-readable storage medium bearing computer program code embodied therein for use with a computer. The computer program code includes: code for receiving, by a user equipment and from a source cell, individual handover commands and corresponding configuration for conditional handover for one or more target cells and an indication to use dual active protocol stack handover if possible in response to a handover, wherein at least one of the target cells also supports the dual active protocol stack handover; code for determining by the user equipment that one or more conditions for handover to one of the one or more target cells have triggered, wherein the one target cell supports dual active protocol stack handover; and code for performing, based on the indication to use dual active protocol stack handover if possible in response to a handover, handover by the user equipment to the one target cell without releasing the source cell while accessing the one target cell.

In another exemplary embodiment, an apparatus comprises means for performing: receiving, by a user equipment and from a source cell, individual handover commands and corresponding configuration for conditional handover for one or more target cells and an indication to use dual active protocol stack handover if possible in response to a handover, wherein at least one of the target cells also supports the dual active protocol stack handover; determining by the user equipment that one or more conditions for handover to one of the one or more target cells have triggered, wherein the one target cell supports dual active protocol stack handover; and performing, based on the indication to use dual active protocol stack handover if possible in response to a handover, handover by the user equipment to the one target cell without releasing the source cell while accessing the one target cell.

DETAILED DESCRIPTION OF THE DRAWINGS

Figure 1:
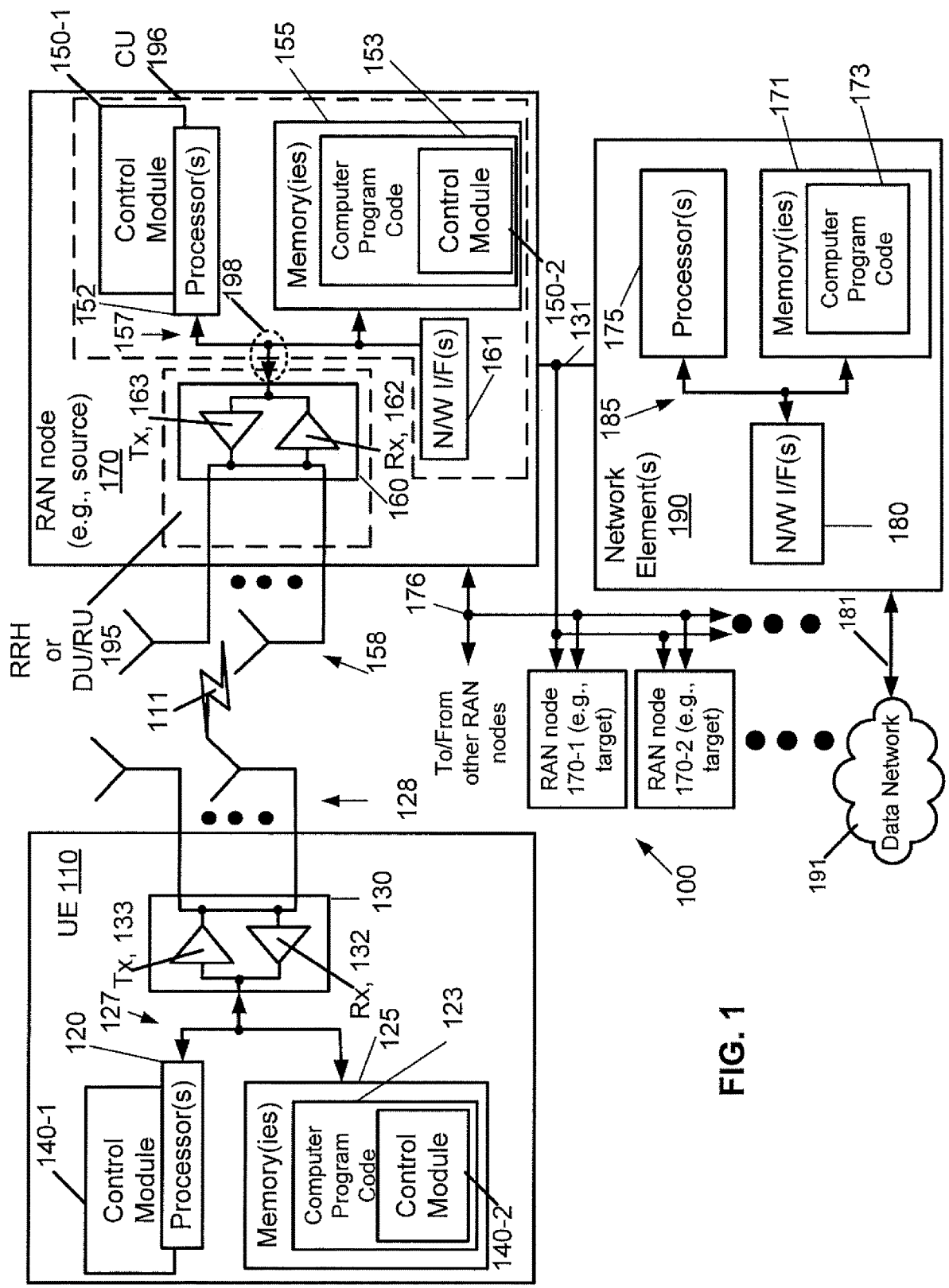
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as either "or", "and", or "both".

The exemplary embodiments herein describe techniques for link recovery via cells prepared with information for handovers including CHO and DAPS. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) nodes 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

There are multiple RAN nodes 170 shown: 170, 170-1, 170-2, and the like. The RAN node 170 might be a source (e.g., where a UE is currently connected) and there might be multiple target RAN nodes 170-1, 170-2, and the like. The target nodes are nodes to which the UE 110 might be handed over. There may be one target RAN node 170-1 or N (N≥2) target RAN nodes 170-1, . . . 170-N. In examples below, there are three cells (which may be referred to as nodes) A, B, and C, and the source cell/node is A and there are two target cells/nodes B and C. This is merely for ease of exposition, however, and is not intended to be limiting.

The RAN nodes 170 are base stations that provides access by wireless devices such as the UE 110 to the wireless network 100. The RAN nodes 170, 170-1, 170-2 (or more) are assumed to be similar, so only the circuitry in RAN node 170 is described. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170, 170-1, . . . , 170-N communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. Each RAN node 170, 170-1, . . . , 170-N is coupled via a link 131 to a network element or elements 190.

The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments, the exemplary embodiments will now be described with greater specificity. It is beneficial before proceeding with additional detail to provide overview of handovers such as conditional handovers (CHOs) and Dual Active Protocol Stack (DAPS) handover.

Figure 2:
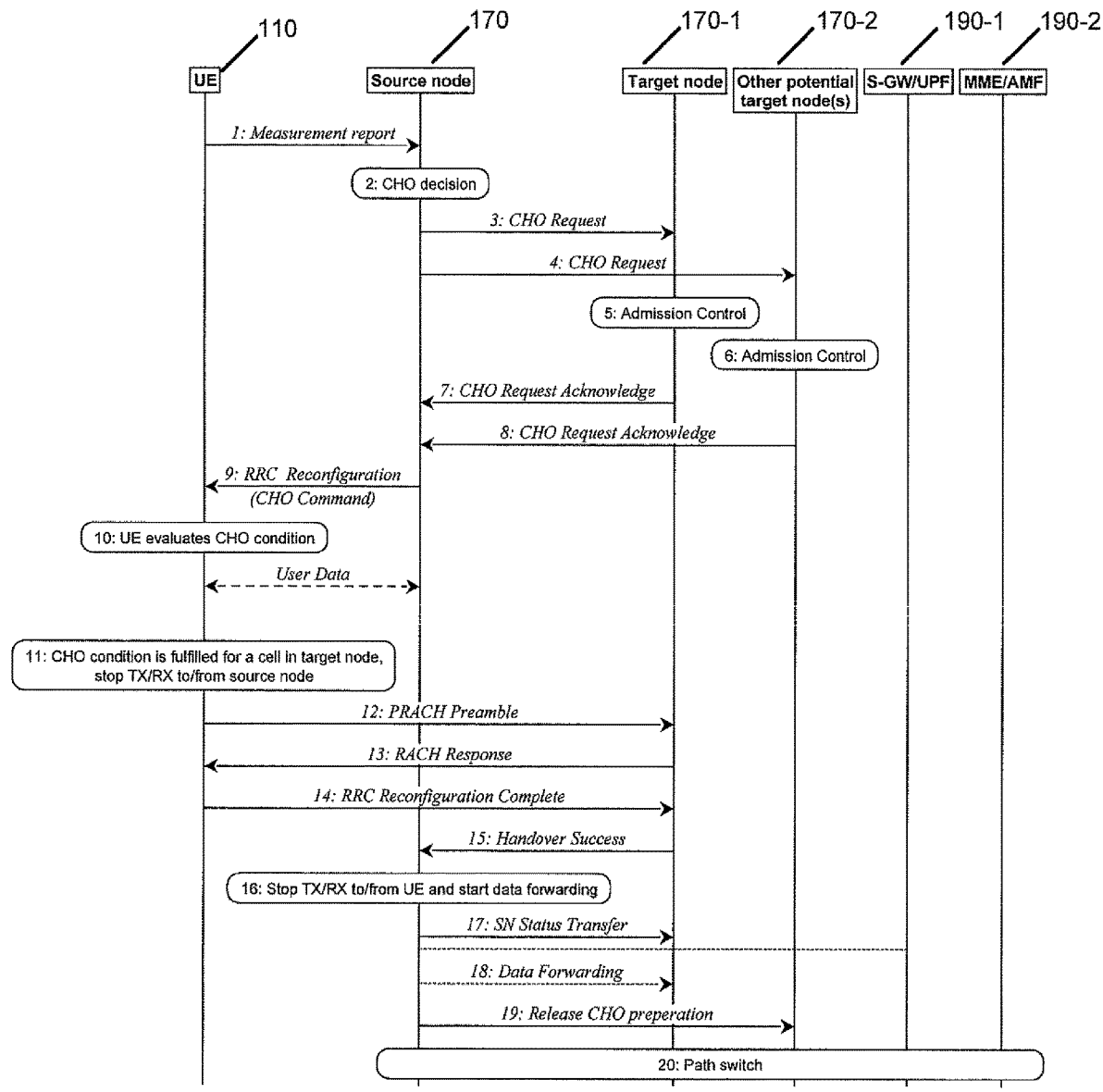
FIG. 2 illustrates an exemplary message sequence for conditional handover.

An exemplary message sequence for conditional handover is shown in FIG. 2. The first steps 1-9 are similar to the baseline handover of NR Rel. 15 [see 3GPP TS 38.300]. This involves a UE 110, a source node 170, two (or more) target nodes 170-1, 170-2, an S-GW/UPF 190-1 and an MME/AMF 190-2. A configured event triggers the UE to send a measurement report in step 1. Based on this report, the source node 170 makes a CHO decision (step 2) and can prepare (steps 3 and 4) one or more target cells 170-1 and 170-2 for the handover (CHO Request and CHO Request Acknowledge) and then sends in step 9 an RRC Reconfiguration (CHO command) to the UE. The target nodes 170-1 and 170-2 (in this example) have performed admission control in steps 5 and 6, respectively, in response to respective steps 3 and 4.

For baseline handover of NR Rel. 15, the UE will immediately access the target cell to complete the handover. Instead, for CHO, the UE will only access the target cell once an additional CHO execution condition expires (this effectively decouples the HO preparation and execution phases). The condition is configured by the source node in the HO Command (CHO command in step 9). With respect to this, the UE evaluates the CHO condition in step 10 and may continue to perform communications (shown as User Data) until in step 11, when the CHO condition is fulfilled for a cell in the target node (in this example target node 170-2), and then the UE 110 stops TX/RX to/from the source node 170.

The CHO handover process includes the UE 110 sending the PRACH Preamble in step 12, the target node 170-1 sending a RACH Response in step 13, and the UE 110 sending the RRC reconfiguration Complete message in step 14. Once the UE completes the handover execution to the target cell (e.g., the UE has sent RRC Reconfiguration Complete), the target cell sends (step 15) to the source cell a "Handover Success" indication. In response to receiving this indication from the target cell, the source cell stops (step 16) its TX/RX to/from UE, sends an SN Status Transfer to the target node in step 17, and starts data forwarding to the target cell in step 18. Moreover, the source may release (step 19) the CHO preparations in other target nodes/cells (which are no longer needed) when the source receives a "HO Success" indication. In this case, the release is for target node 170-2. The path switch in step 20 causes a change of the path for providing packets from the core network. When the HO is successful, the path will be switched so that now the path is through the new target cell, which directly communicates with the core (e.g., UPF/AMF, shown in FIG. 2).

The advantage of the CHO is that the HO command can be sent very early, when the UE is still safely in the source cell, without risking the access in the target cell and the stability of its radio link. That is, conditional handover provides mobility robustness.

Figure 3:
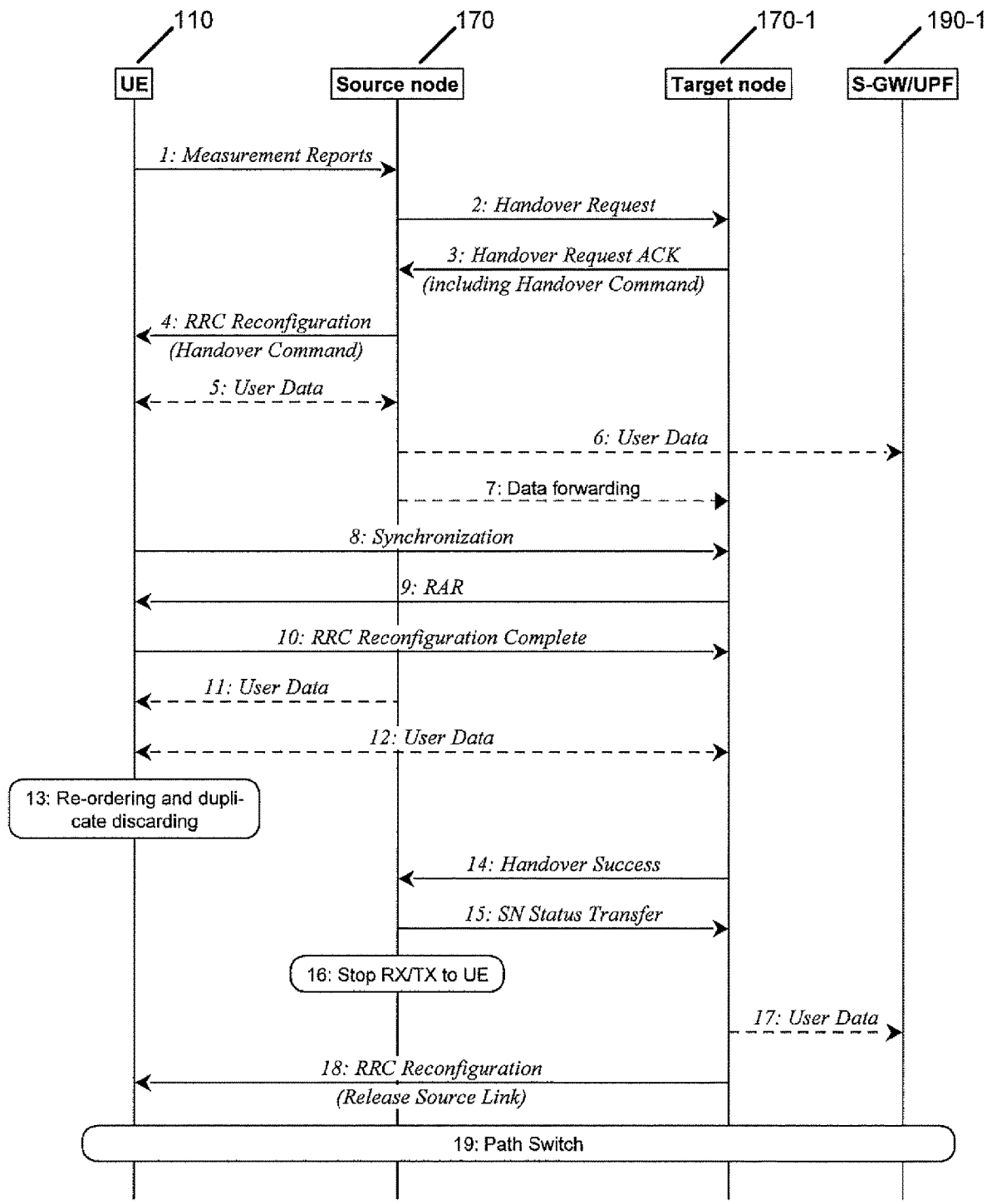
FIG. 3 illustrates an exemplary message sequence for DAPS signaling flow.

Concerning DAPS handover, a DAPS solution has been introduced in Rel. 16 to achieve close to 0 ms (zero millisecond) interruption time in downlink (DL) and uplink (UL). The signaling diagram of DAPS handover is shown in FIG. 3. In step 1, the UE sends a measurement report (or reports), and the source node 170 sends a Handover Request to the target node 170-1 in step 2. In step 3, the target node 170-1 responds with a Handover Request ACK (acknowledge), including a Handover Command. The source node 170 in step 4 sends an RRC Reconfiguration message, including the Handover Command. The UE 110 may continue to send user data (step 5) to the source node, and the source node forwards this to the S-GW/UPF 190-1 in step 6 and also performs data forwarding to the target node 170-1 in step 7.

Here, each of the source and target cells has a full L2 (layer 2) protocol stack with its own security key for ciphering and deciphering of the Packet Data Convergence Protocol (PDCP) Service Data Units (SDUs). To avoid a hard handover causing service interruption, the UE should establish a new radio link with respect to the target cell (steps 8-10 in FIG. 3) before detaching the radio link of the source cell (step 18 in FIG. 2). That is, for some time before releasing the source cell, the UE would be exchanging data with both source and target nodes (step 11-12).

In step 8, the UE performs synchronization with the target node 170-1, which sends (step 9) an RAR (Random Access Response) message after synchronization. In step 10, the UE sends an RRC Reconfiguration Complete message to the target node 170-1. The source node 170 can continue to send source data (step 11), and the UE 110 and target node 170-1 can exchange user data in step 12. The UE 110 in step 13 performs re-ordering and duplicate discarding, e.g., to examine data from both steps 11 and 12 and also to discard duplicates received over both.

In step 14, the target node 170-1 sends a Handover Success message to the source node, and in step 15, the source node 170 sends an SN Status Transfer message to the target node 170-1. The source node 170 stops RX/TX to the UE in step 16.

The target nodes 170-1 sends user data to the S-GW/UPF 190-1 in step 17, and also sends RRC Reconfiguration (e.g., including a Release Source Link) in step 18. In step 19, a path switch is performed between the entities.

The combination of CHO and DAPS solutions would be useful to provide both mobility robustness and interruption time reduction during the handover. This combination has been discussed in Rel. 16 but not specified due to lack of time and is expected to be specified in future 3GPP releases (from Rel-17 onwards).

As such, both 1) CHO and 2) CHO with DAPS solutions can co-exist: That is, it may happen that target cell B provides CHO with DAPS configuration whereas another target cell (e.g., target cell C in FIG. 4, described below) may provide only CHO configuration, e.g., target C decides to prepare CHO without DAPS if receiving CHO Request with DAPS. It is noted that the terms "cell" and "node" may be used interchangeably herein, but (as previously described), one node may form multiple cells.

Figure 4:
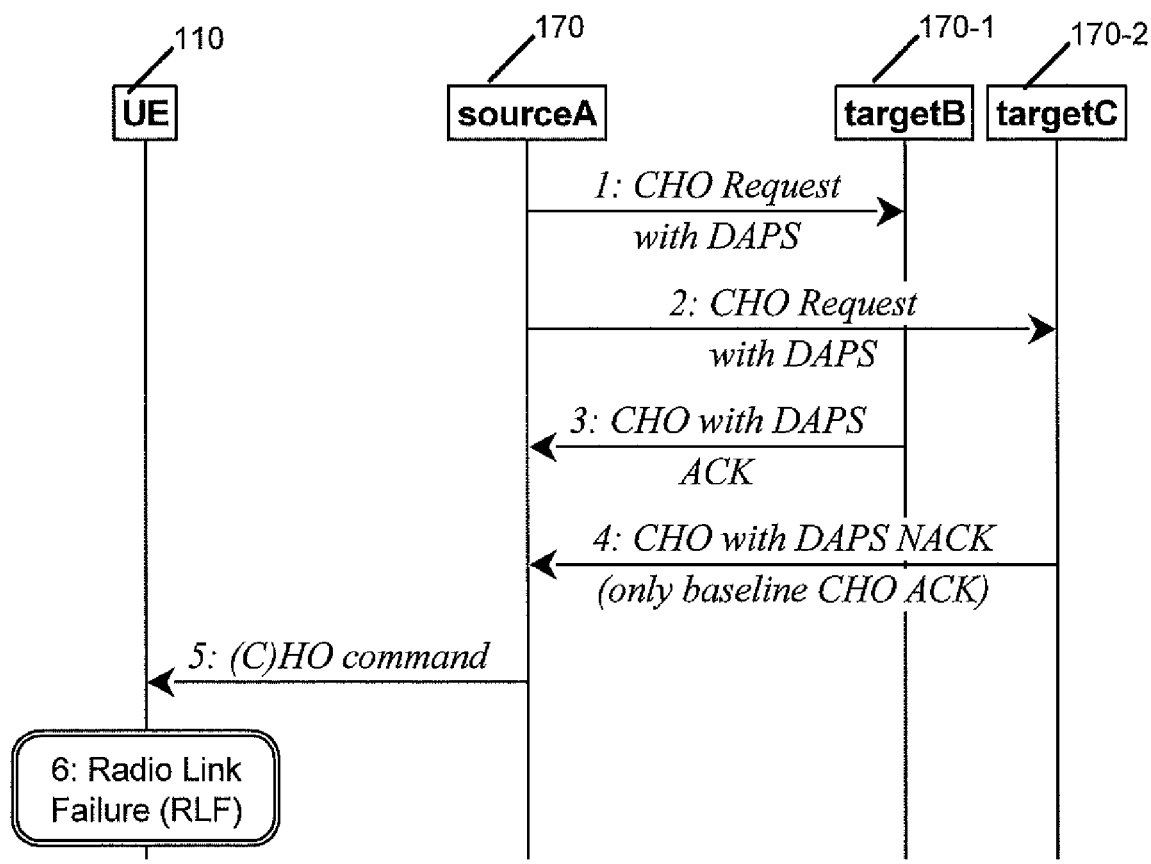
FIG. 4 illustrates different preparations for an example of CHO and another example of both CHO and DAPS.

Turning to FIG. 4, this figure illustrates different preparations for CHO and CHO+DAPS. In steps 1 and 2, the source cell (source A) 170 sends a CHO request with DAPS to the target cell (target B) 170-1, and also to target cell (target C) 170-2. In this example, the target B responds in step 3 with a CHO with DAPS ACK, and also the target C responds with DAPS NACK (not acknowledged), e.g., indicating only baseline CHO ACK (and not DAPS).

Source cell A 170 sends a HO command (step 5 in FIG. 4), which comprises the configurations for target B (with DAPS) and for target C (without DAPS). After some time, the Radio Link Failure (RLF) may happen in the source cell (see step 6), as the UE does not execute the handover immediately after receiving HO command in step 5 (this is a Conditional Handover). The UE might have been configured with recovery via CHO (a mechanism defined as a part of Rel-16 CHO, which allows to use CHO configurations in case of RLF or HOF, if a selected cell during reestablishment is a CHO candidate).

Exemplary issues that are addressed herein are summarized as follows:

A first issue, referred to as "issue 1", is as follows. When the UE attempts recovery via CHO and target B has been selected (with both CHO and DAPS configuration), the UE may fail in response to recovery from a RLF/HOF, as the UE will not be able to execute recovery via CHO including DAPS configuration for some bearers. This is because DAPS assumes the UE 110 keeps the source link while attempting to access the target. However, the source link is gone (at failure). In more detail, the DAPS configuration assumes the bearers are served by both the source and the target cells, so when the source cell fails and recovery actions are applied, the same configuration is not usable, as bearers are not served (after link failure).

A second issue, referred to as "issue 2", is as follows. This issue is related to UE's behavior when the UE receives the RRC Reconfiguration with HO command (step 5 in FIG. 4). As per the legacy standard, the UE decodes just the CHO condition, which is sent outside of the CHO configuration for the target cell. When the condition is met, the UE detaches from the source cell and decodes/applies the configuration for selected target cell. However, if the configuration comprised both CHO and DAPS, this will be an incorrect behavior, as the UE shall not (according to the standard) detach from the source when the CHO execution condition is met, but rather stay with an operational link to source A while executing a handover to target B (where both CHO and DAPS are configured, so keeping the link to the source cell is required during handover).

As stated above, for the first issue, the UE may not be able to comply with the target cell configuration prepared with DAPS when performing CHO recovery. One option is for the UE to perform RRC Re-establishment. That is, when the link fails (RLF) or handover execution fails (HOF), the UE executes reestablishment. That is the legacy procedure. However, in Rel-16 an enhancement for CHO was designed and if a selected cell during reestablishment is a CHO candidate, the UE may try to attempt CHO (again). Otherwise, the UE would continue with the legacy reestablishment. Herein, such cases are targeted when a CHO with DAPS candidate is selected during such reestablishment.

Exemplary embodiments herein include several solutions to address the issue of HO preparations for multiple cells, where some of those cells are prepared with CHO, and some are prepared with both CHO and DAPS. A brief introduction is provided here, and then more detail is provided below.

Four different examples are proposed for issue 1 above.
1) DAPS-Activation-status and also cause associated with the status may be sent to the selected target cell prepared with DAPS in response to the target cell being selected by UE during CHO recovery. In response, the target cell provides a new configuration for recovery, without DAPS. For instance, a UE might report CHO Failure Information and, in response, the target cell could provide new configuration. See FIG. 5 for an example.
2) Upon HOF/RLF, the UE continues with CHO and DAPS configuration and attempts to access the target cell. An indication that this access is a CHO-recovery action (not typical DAPS action) is inserted into the message sent to the target cell. See FIG. 6 for an example.
3) Upon RLF/HOF, the UE performs cell selection as a part of CHO recovery procedure and performs CHO execution as long as the selected cell is configured just with CHO (and not with CHO and DAPS). See FIG. 7 for an example.
4) Each target cell providing the CHO and DAPS configuration, sends also a fallback configuration (with no DAPS), to be used by the UE in response to this cell being chosen in a CHO recovery procedure. See FIG. 8 for an example.

Concerning issue 2, in an exemplary embodiment, the source cell provides DAPS indication outside of the target cell RRC configuration. This will be decoded by the UE immediately (e.g., directly after receiving the RRC Reconfiguration with CHO and DAPS) in response to the RRC Reconfiguration being received (and not when the UE already executes the handover). See FIG. 9 as one example.

More details concerning each of those options are disclosed in the below description. It should also be noted that techniques to address the first and second issues can be combined.

This section comprises a detailed description with the corresponding figures, explaining the ideas briefly introduced above. It should be noted that the messaging sequence diagrams herein illustrate the operation of an exemplary method or methods, a result of execution of computer program instructions embodied on a computer readable memory, functions performed by logic implemented in hardware, and/or interconnected means for performing functions in accordance with exemplary embodiments. In exemplary embodiments, the operations performed by the UE can be performed by the control unit 140 in order to control the UE 110, and the operations performed by a RAN node 170 can be performed by a control unit 150 in order to control the corresponding node 170.

Figure 5:
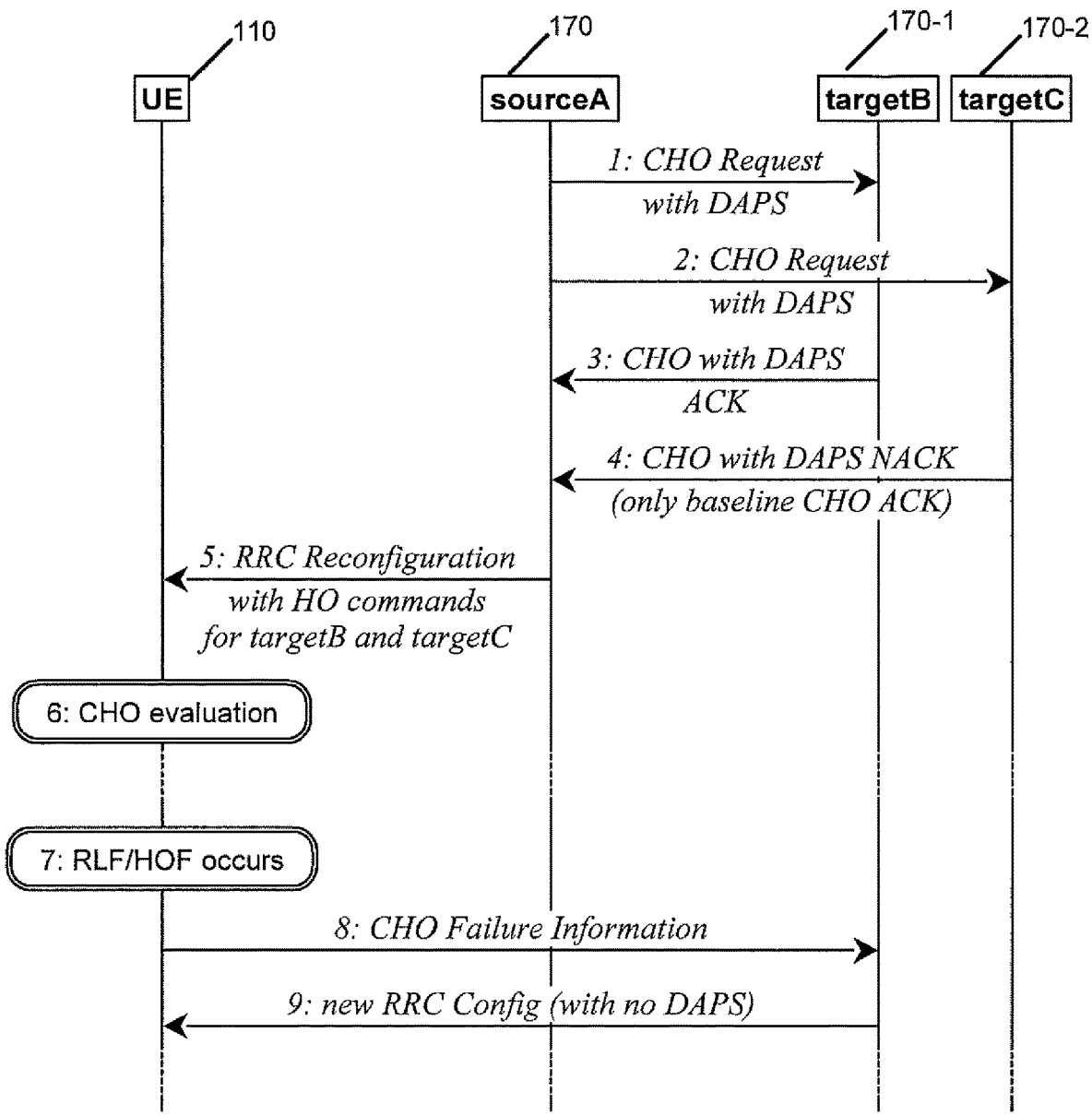
FIG. 5 illustrates an exemplary message sequence for CHO Failure Information to obtain a configuration without DAPS, in accordance with an exemplary embodiment.

In terms of a first technique to address issue 1 above, one example uses CHO failure information. This example is explained using FIG. 5, which illustrates an exemplary message sequence for CHO Failure Information to obtain a configuration without DAPS, in accordance with an exemplary embodiment. The first four steps in FIG. 5 are the same as in FIG. 4. In step 5, the source cell A 170 sends an RRC Reconfiguration message with HO commands for target cell B ("targetB") and target cell C ("targetC").

The UE 110 performs a CHO evaluation (step 6) and then determines (step 7) an RLF or HOF occurs. As is known, a HOF is a specific type of RLF as well. In FIG. 5, it is assumed an RLF happens when the UE is still attached to the source cell and evaluates the condition for CHO. A HOF may happen after the UE has initiated a HO towards one of the target cells (e.g., target cell B or C). The UE 110 can be considered to "break" the link to the source cell when the initiates the target cell access, for example when a condition for CHO is met. However, the situation is different for DAPS, where the UE stays in the source while trying to access the target. A similar situation could occur for a combination of DAPS and CHO.

The CHO evaluation(s) performed in step 6 are not valid anymore when HOF/RLF happens. However, those configurations for cells prepared with CHO (or CHO+DAPS) stay valid and could be used in in recovery actions, and the CHO evaluation(s) may determine which cells are (or were) available. That is, when HOF/RLF occurs, the UE cannot perform any kind of handover (even if the was prepared with CHO configurations). Instead, the UE initiates a reestablishment procedure and performs cell selection (e.g., a legacy way). If the selected cell turns out to be a CHO candidate cell, the UE attempts CHO execution. Otherwise, a legacy reestablishment is continued.

In the example of FIG. 5, when performing CHO recovery after the RLF/HOF occurs, the UE 110 may select a target cell B 170-1, which was a candidate with configuration including both CHO and DAPS. The recovery using DAPS is not applicable in this case, as the link to the source cell 170 is not available after declaring RLF or HOF. Thus, the UE 110 may send a new message (step 8) to the selected cell (target B), as depicted in FIG. 5. This new message includes CHO Failure Information, which alerts the target cell B 170-1 that there was a failure between the UE 110 and any of the source or target cells, or the network in general.

Upon the reception of such message (Step 8 in FIG. 5), the target cell 170-1 knows the cell has to provide a new configuration for that UE, without the DAPS part, as this will not be applied anyway. This occurs in Step 9 of FIG. 5, where a new RRC Config (configuration) message is sent, but with no DAPS information. That is, the new RRC configuration allows the UE 110 to connect to the target cell B 170-1 without DAPS.

Figure 6:
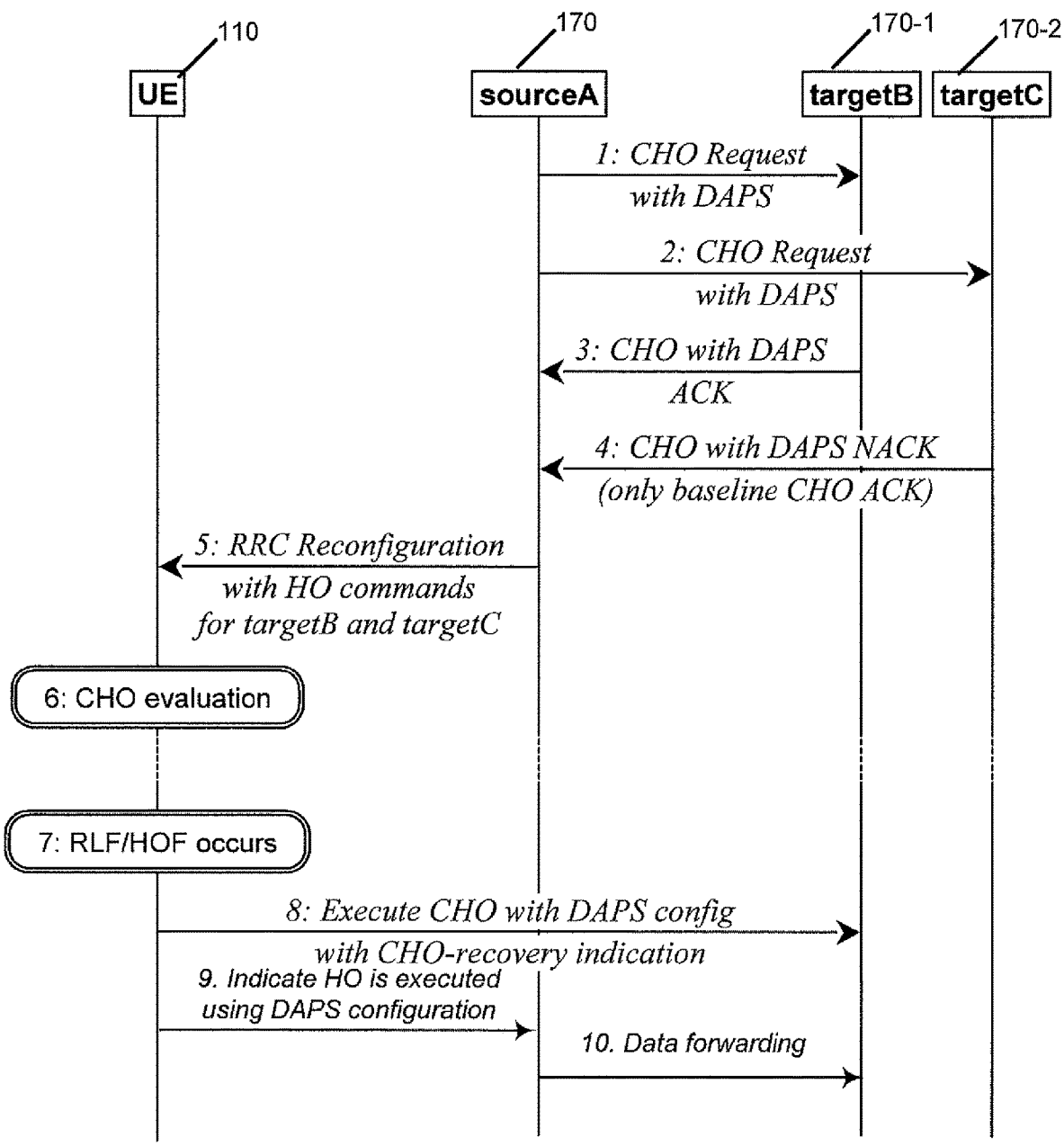
FIG. 6 illustrates an exemplary message sequence for executing CHO and DAPS, with recovery indication, in accordance with an exemplary embodiment.

A second technique to address issue 1 above is to execute CHO with DAPS, indicating recovery. This is illustrated by FIG. 6, in an exemplary embodiment. The first seven steps of FIG. 6 are the same as the first six steps in FIG. 5. In this other approach, the UE 110 may attempt to use the configuration provided beforehand (i.e., the configuration for CHO and DAPS execution towards target cell B). This may not be optimal, as the link to the source cell is gone after RLF/HOF (see FIG. 6) and the DAPS bearers are not served anyway. However, the UE applies the part related to accessing the target cell B 170-1 and informs the target cell 170-1 that this access is performed as a result of recovery (i.e., no DAPS part is kept, no DRBs are still kept in the source, and the like). This is depicted in Step 8 of FIG. 6, with the UE 110 sending the Execute CHO with DAPS config message, with CHO-recovery indication, to the target B cell 170-1. Upon reception of the new indication in step 8 of FIG. 6, the target cell 170-1 decides (not shown) whether to provide a new RRC reconfiguration. If the target cell decides to provide this new RRC reconfiguration, this could be similar to step 9 of FIG. 5. However, the decision to send the reconfiguration may be taken if the NW/target cell decides the UE cannot continue using this current configuration, which was used to recover.

If the target cell, selected first based on measurement condition, is a CHO candidate cell and a HOF occurred, the UE attempts to select a best cell for CHO recovery. If this cell selected for CHO recovery is configured with CHO and DAPS, the UE may also resume a source SRB to send an (e.g., RRC) message (or messages) to the source node 170 indicating that HO is executed using DAPS configuration. See step 9. It should be noted that such and RRC message is additional to the legacy procedure, where no such signaling is supported in case of recovery. The source node 170 may start forwarding any packets meant for the UE 110 (e.g., received by the source node from the core network, or sent by the source node to the UE but not acknowledged by the UE, prior to and/or after RLF/HOF) but without resuming scheduling on the source cell, e.g., because the source cell link has failed. See step 10.

Figure 7:
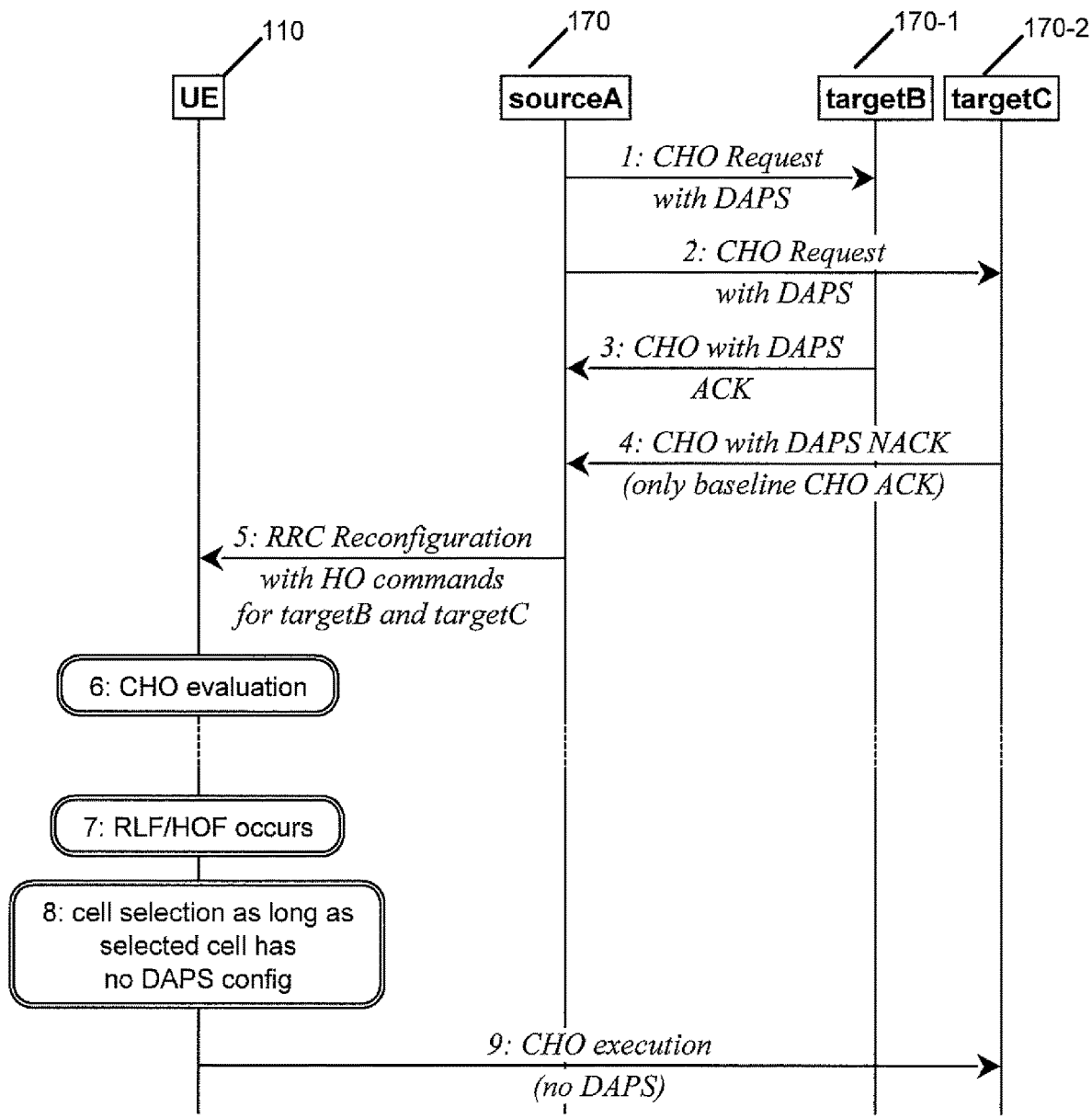
FIG. 7 illustrates an exemplary message sequence for excluding cells with CHO and DAPS, in accordance with an exemplary embodiment.
Figure 8:
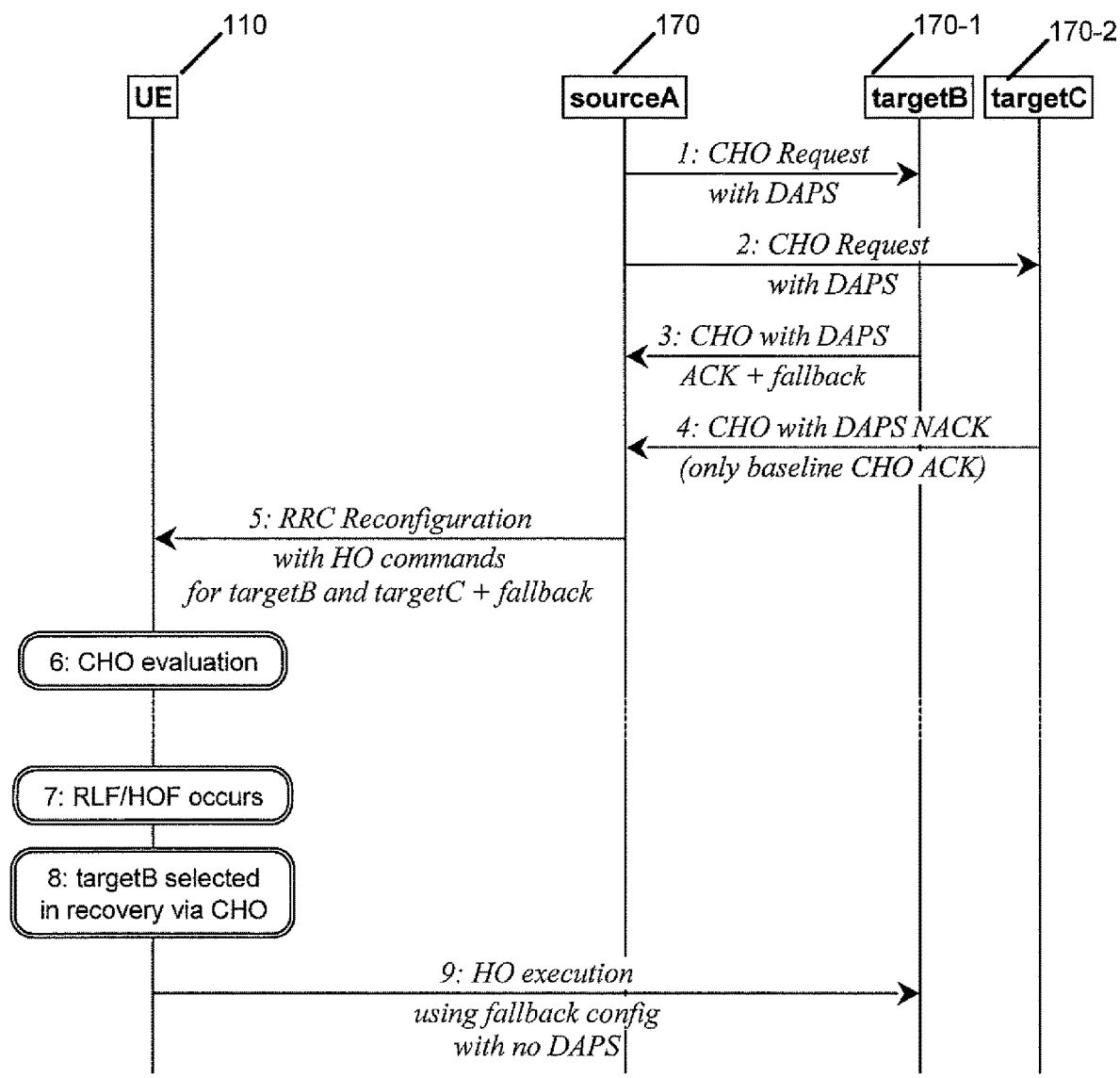
FIG. 8 illustrates an exemplary message sequence for fallback configuration from target cells with CHO and DAPS, in accordance with an exemplary embodiment.

A third technique to address issue 1 above is excluding prepared cells configured with CHO and DAPS from the CHO recovery procedure. This is illustrated by FIG. 7. The first seven steps of FIG. 7 are the same as the first seven steps of FIG. 6. In this other embodiment, the UE may exclude the cells which were configured with CHO and DAPS when performing CHO recovery.

If a selected cell was configured with CHO and DAPS, the UE skips this cell and re-selects the next suitable cell. If the next suitable cell is configured with CHO, the UE performs CHO execution. The UE skips target cell B, which is configured with CHO and DAPS. Instead, the UE accesses target cell C 170-2, which is configured with CHO but not with DAPS.

Otherwise, if the next suitable cell is not prepared with CHO, the UE performs re-establishment. Otherwise in this context should mean if there is no suitable cell which is not prepared with DAPS (i.e., all cells have this DAPS part). In another embodiment, the UE might perform re-establishment immediately after detecting that the first selected cell is configured with CHO and DAPS.

This can be combined with DAPS indication sent outside of the target's configurations (shown in FIG. 9, described below, which is a solution to issue 2) which can help in accelerating the process, as the UE does not have to decode each cell's configuration to get to know which cell was prepared with both CHO and DAPS or CHO alone.

FIG. 7 shows an exemplary implementation of this idea. In step 8 of FIG. 7, it is shown that the UE continues a cell selection process if a selected cell comprises CHO and DAPS (in this case, target cell B 170-1). The UE selects a next suitable cell and if the cell does not have the DAPS component, the UE executes CHO (see step 9 in FIG. 7). The CHO execution can happen as a part of recovery actions, e.g., as per Rel-16 mechanisms.

As an additional, fourth technique to address issue 1 above, this includes fallback configuration from target cells preparing CHO and DAPS. See FIG. 8. This embodiment assumes a problematic case can be handled thanks to the fallback configuration, provided beforehand, in the ordinary HO Request procedure between the source and target cells/nodes. This sort of configuration may be included by each cell which does accept a DAPS request and provides the CHO and DAPS configuration (step 3 in FIG. 8). In case of HOF/RLF (step 7), the UE accesses such selected cell using this DAPS-free configuration (step 9 in FIG. 8). The fallback configuration may be, e.g., normal cell configuration such as RRC configuration, which is applied for the selected cell. The fallback information should not have DAPS information.

Figure 9:
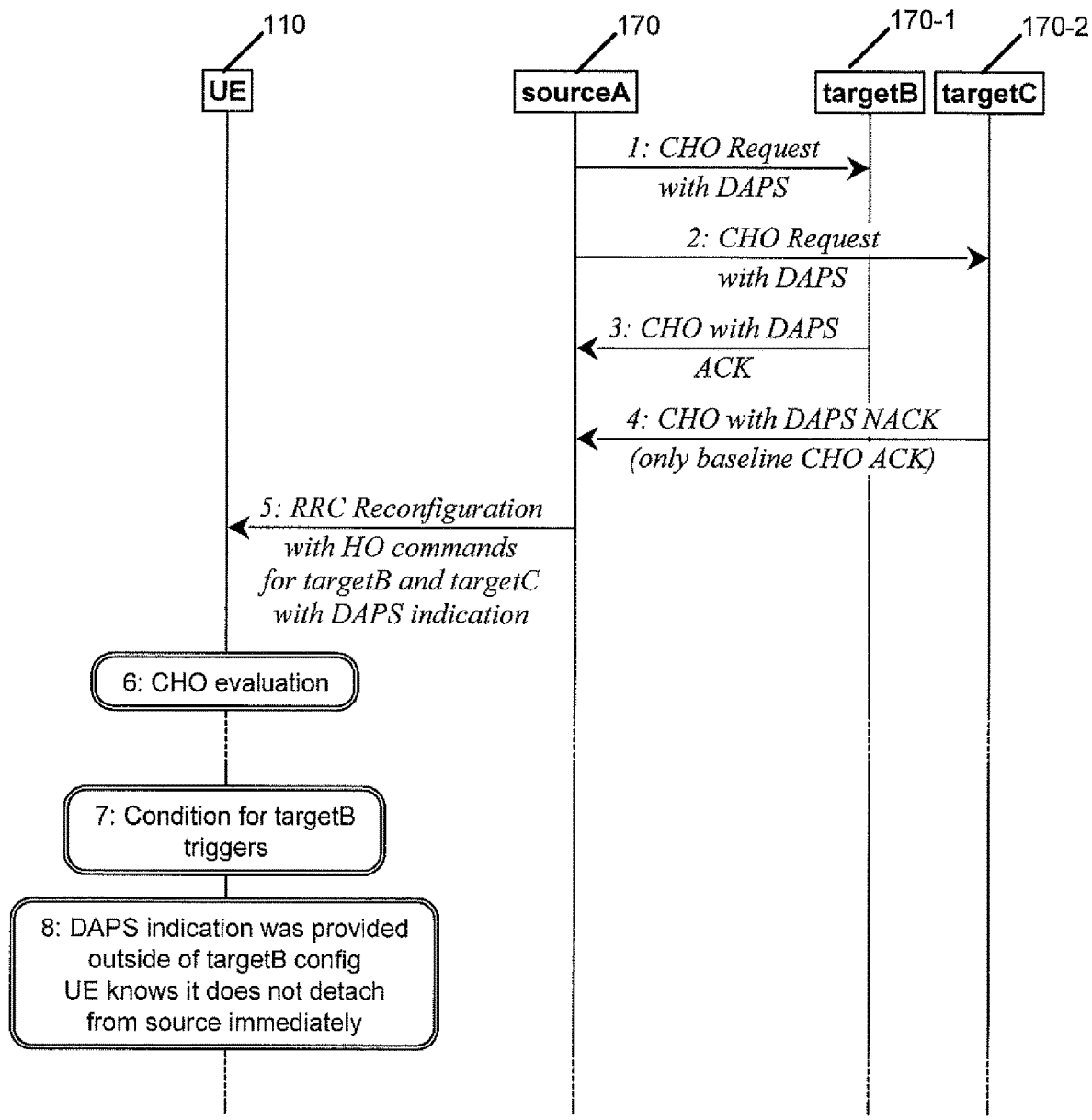
FIG. 9 illustrates an exemplary message sequence for DAPS indication outside of the target cell RRC configuration.

As an exemplary embodiment for issue 2, FIG. 9 illustrates DAPS indication outside of target cell's configuration, in accordance with an exemplary embodiment. FIG. 9 depicts the DAPS indication sent outside of the target's configuration. The first four steps are the same as in FIG. 4, where the source cell 170 prepares the HO with two target cells, one of them accepts CHO and DAPS, another rejects the DAPS part. In step 5, the source cell A 170 sends a HO command via an RRC Reconfiguration message to the UE. The HO command contains target configurations for cell B (with CHO and DAPS) and cell C (with CHO only).

In addition to the legacy behavior, the source cell A 170 includes a DAPS indication for the target cell B, so that the UE knows without decoding the entire configuration for target cell B that when a corresponding condition triggers (Step 7), the HO shall (in this example) be executed in DAPS manner (i.e., without releasing the source cell A while accessing the target cell B). This is depicted in Step 8 of FIG. 4. Step 8 can involve a HO that is executed with DAPS, i.e., a source link is kept while the UE attempts to access the target cell.

That is, the indication about DAPS is sent and received (step 5) by the UE at the same time when target cell configurations for executing CHO(+DAPS) HO are received. However, the reception of such message (comprising all mentioned above) is a different thing than its decoding (i.e., the UE receives everything, but does not decode the whole configurations immediately). When CHO is configured, the UE decodes only the CHO execution condition to evaluate (which should start immediately after receiving the message), which is part of the legacy system. In an exemplary embodiment herein, in addition to the decoding of the CHO execution condition, this indication there is a DAPS part for some of the cells, is sent outside of the target cell configurations (e.g., and is also decoded directly after receiving such reconfiguration, together with the CHO execution conditions). This means that when the condition for target cell B triggers in step 7, the UE already knows (via the indication of the DAPS part in step 5 and its decoding) that the UE should not detach from the source cell immediately for a HO to target cell B.

Technical effects and advantages of exemplary embodiments herein include one or more of the following:

1) Resolves ambiguities if CHO and DAPS are configured simultaneously; and/or
2) Allows the UE to be immediately aware (i.e., not after CHO is triggered) which cells have been configured with CHO+DAPS, not only with CHO; and/or
3) Defines quick and efficient recovery actions if the handover or source link fails while the UE was prepared with CHO+DAPS.

The following are additional examples.

Example 1. A method, comprising:
  receiving, by a user equipment and from a source cell, configuration for conditional handover for one or more target cells, wherein at least one of the one or more target cells also supports dual active protocol stack handover;
  determining by the user equipment that one of a radio link failure or a handover failure has occurred;
  selecting by the user equipment, using at least the configuration, one of the one or more target cells for a handover; and
  performing a process for handover to the selected target cell.

Example 2. The method of example 1, wherein the selected target cell supports both the conditional handover and the dual active protocol stack handover, and wherein performing the process for the handover to the selected target cell comprises:
  sending, by the user equipment and to the selected target cell, a message comprising an indication of a conditional handover failure; and
  receiving, by the user equipment and from the selected target cell, a new radio resource configuration.

Example 3. The method of example 2, wherein the new radio resource configuration allows handover by the user equipment to the selected target cell without using dual active protocol stack handover.

Example 4. The method of example 3, further comprising performing by the user equipment the handover to the selected target cell without using dual active protocol stack handover.

Example 5. The method of example 1, wherein performing the process for the handover to the selected target cell comprises:
  executing, by the user equipment and with the selected target cell, a conditional handover with dual active protocol stack configuration, the selected target cell supporting both the conditional handover and the dual active protocol stack handover.

Example 6. The method of example 5, further comprising the user equipment resuming a source signaling radio bearer to send one or more messages to the source cell indicating that handover is executed using dual active protocol stack configuration.

Example 7. The method of example 6, wherein the message is a radio resource control message.

Example 8. The method of example 1, wherein:
selecting one of the one or more target cells to use for a handover further comprises selecting a target cell that has no configuration for dual active protocol stack handover;
performing the process for the handover to the selected target cell comprises executing a conditional handover without a dual active protocol stack handover to the selected target cell.

Example 9. The method of example 1, wherein:
receiving the configuration for conditional handover for one or more target cells includes receiving indication of a fallback configuration to be used in response to a radio link failure or handover failure;
selecting one of the one or more target cells to use for the handover further comprises selecting a target cell that has configuration for both the conditional handover and the dual active protocol stack handover but also supports the fallback configuration; and
performing the process for the handover to the selected target cell comprises executing a handover to the selected target cell using at least the fallback configuration.

Example 10. The method of example 9, wherein the fallback configuration does not contain dual active protocol stack information and is provided only by those target cells which have accepted a handover request including both conditional handover and dual active protocol stack handover.

Example 11. The method of any one of the examples above, wherein:
the method further comprises, prior to the determining by the user equipment that one of a radio link failure or a handover failure has occurred, performing by the user equipment a conditional handover evaluation to determine which of the one or more target cells will be used in case a handover is to be performed; and
selecting by the user equipment, using the configuration, one of the one or more target cells for a handover further comprises using information from the conditional handover evaluation to select the selected target cell.

Example 12. A method, comprising:
receiving, by a user equipment and from a source cell, individual handover commands and corresponding configuration for conditional handover for one or more target cells and an indication to use dual active protocol stack handover if possible in response to a handover, wherein at least one of the target cells also supports the dual active protocol stack handover; determining by the user equipment that one or more conditions for handover to one of the one or more target cells have triggered, wherein the one target cell supports dual active protocol stack handover; and
performing, based on the indication to use dual active protocol stack handover if possible in response to a handover, handover by the user equipment to the one target cell without releasing the source cell while accessing the one target cell.

Example 13. The method of example 12, wherein the indication indicates the user equipment should perform handover without releasing the source cell while accessing a target cell.

Example 14. The method of claim 13, wherein the indication to use the dual active protocol stack handover is decoded by the user equipment outside of and before decoding the configuration for conditional handover.

Example 15. The method of claim 14, wherein the user equipment decodes and knows a value of the indication, and wherein the decoding is performed after receiving the individual handover commands and corresponding configuration, but before the determining by the user equipment that one or more conditions for handover have been triggered in order for the user equipment to determine not to release the source cell while accessing the one target cell in response to the one or more conditions for handover being triggered for the one target cell.

Example 16. A computer program, comprising code for performing the methods of any of examples 1 to 15, when the computer program is run on a computer.

Example 17. The computer program according to example 16, wherein the computer program is a computer program product comprising a computer-readable medium bearing computer program code embodied therein for use with the computer.

Example 18. The computer program according to example 16, wherein the computer program is directly loadable into an internal memory of the computer.

Example 19. An apparatus comprising means for performing:
receiving, by a user equipment and from a source cell, configuration for conditional handover for one or more target cells, wherein at least one of the one or more target cells also supports dual active protocol stack handover;
determining by the user equipment that one of a radio link failure or a handover failure has occurred;
selecting by the user equipment, using at least the configuration, one of the one or more target cells for a handover; and
performing a process for handover to the selected target cell.

Example 20. The apparatus of example 19, wherein the selected target cell supports both the conditional handover and the dual active protocol stack handover, and wherein the means for performing the process for the handover to the selected target cell comprises:
means for sending, by the user equipment and to the selected target cell, a message comprising an indication of a conditional handover failure; and
means for receiving, by the user equipment and from the selected target cell, a new radio resource configuration.

Example 21. The apparatus of example 20, wherein the new radio resource configuration allows handover by the user equipment to the selected target cell without using dual active protocol stack handover.

Example 22. The apparatus of example 21, further comprising means for performing by the user equipment the handover to the selected target cell without using dual active protocol stack handover.

Example 23. The apparatus of example 19, wherein means for performing the process for the handover to the selected target cell comprises:
means for executing, by the user equipment and with the selected target cell, a conditional handover with dual active protocol stack configuration, the selected target cell supporting both the conditional handover and the dual active protocol stack handover.

Example 24. The apparatus of example 23, further comprising means for resuming by the user equipment a source signaling radio bearer to send one or more messages to the source cell indicating that handover is executed using dual active protocol stack configuration.

Example 25. The apparatus of example 24, wherein the message is a radio resource control message.

Example 26. The apparatus of example 19, wherein:
the means for selecting one of the one or more target cells to use for a handover further comprises means for selecting a target cell that has no configuration for dual active protocol stack handover;
the means for performing the process for the handover to the selected target cell comprises means for executing a conditional handover without a dual active protocol stack handover to the selected target cell.

Example 27. The apparatus of example 19, wherein:
the means for receiving the configuration for conditional handover for one or more target cells includes means for receiving indication of a fallback configuration to be used in response to a radio link failure or handover failure;
the means for selecting one of the one or more target cells to use for the handover further comprises means for selecting a target cell that has configuration for both the conditional handover and the dual active protocol stack handover but also supports the fallback configuration; and
the means for performing the process for the handover to the selected target cell comprises means for executing a handover to the selected target cell using at least the fallback configuration.

Example 28. The apparatus of example 27, wherein the fallback configuration does not contain dual active protocol stack information and is provided only by those target cells which have accepted a handover request including both conditional handover and dual active protocol stack handover.

Example 29. The apparatus of any one of examples 19 to 28 wherein:
the apparatus further comprises means for performing, performed prior to the determining by the user equipment that one of a radio link failure or a handover failure has occurred, by the user equipment a conditional handover evaluation to determine which of the one or more target cells will be used in case a handover is to be performed; and
the means for selecting by the user equipment, using the configuration, one of the one or more target cells for a handover further comprises means for using information from the conditional handover evaluation to select the selected target cell.

Example 30. An apparatus comprising means for performing:
receiving, by a user equipment and from a source cell, individual handover commands and corresponding configuration for conditional handover for one or more target cells and an indication to use dual active protocol stack handover if possible in response to a handover, wherein at least one of the target cells also supports the dual active protocol stack handover; determining by the user equipment that one or more conditions for handover to one of the one or more target cells have triggered, wherein the one target cell supports dual active protocol stack handover; and
performing, based on the indication to use dual active protocol stack handover if possible in response to a handover, handover by the user equipment to the one target cell without releasing the source cell while accessing the one target cell.

Example 31. The apparatus of example 30, wherein the indication indicates the user equipment should perform handover without releasing the source cell while accessing a target cell.

Example 32. The apparatus of example 31, wherein the indication to use the dual active protocol stack handover is decoded by the user equipment outside of and before decoding the configuration for conditional handover.

Example 33. The apparatus of example 32, wherein the user equipment decodes and knows a value of the indication, and wherein the decoding is performed after receiving the individual handover commands and corresponding configuration, but before the determining by the user equipment that one or more conditions for handover have been triggered in order for the user equipment to determine not to release the source cell while accessing the one target cell in response to the one or more conditions for handover being triggered for the one target cell.

Example 34. An apparatus, comprising:
one or more processors; and
one or more memories including computer program code,
wherein the one or more memories and the computer program code are configured, with the one or more processors, to cause the apparatus to perform operations comprising: receiving, by a user equipment and from a source cell, configuration for conditional handover for one or more target cells, wherein at least one of the one or more target cells also supports dual active protocol stack handover;
determining by the user equipment that one of a radio link failure or a handover failure has occurred;
selecting by the user equipment, using at least the configuration, one of the one or more target cells for a handover; and
performing a process for handover to the selected target cell.

Example 35. An apparatus, comprising:
one or more processors; and
one or more memories including computer program code,
wherein the one or more memories and the computer program code are configured, with the one or more processors, to cause the apparatus to perform operations comprising:
receiving, by a user equipment and from a source cell, individual handover commands and corresponding configuration for conditional handover for one or more target cells and an indication to use dual active protocol stack handover if possible in response to a handover, wherein at least one of the target cells also supports the dual active protocol stack handover; determining by the user equipment that one or more conditions for handover to one of the one or more target cells have triggered, wherein the one target cell supports dual active protocol stack handover; and
performing, based on the indication to use dual active protocol stack handover if possible in response to a handover, handover by the user equipment to the one target cell without releasing the source cell while accessing the one target cell.

Example 36. A computer program product comprising a computer-readable storage medium bearing computer program code embodied therein for use with a computer, the computer program code comprising:

code for receiving, by a user equipment and from a source cell, configuration for conditional handover for one or more target cells, wherein at least one of the one or more target cells also supports dual active protocol stack handover;

code for determining by the user equipment that one of a radio link failure or a handover failure has occurred;

code for selecting by the user equipment, using at least the configuration, one of the one or more target cells for a handover; and code for performing a process for handover to the selected target cell.

Example 37. A computer program product comprising a computer-readable storage medium bearing computer program code embodied therein for use with a computer, the computer program code comprising:

code for receiving, by a user equipment and from a source cell, individual handover commands and corresponding configuration for conditional handover for one or more target cells and an indication to use dual active protocol stack handover if possible in response to a handover, wherein at least one of the target cells also supports the dual active protocol stack handover; code for determining by the user equipment that one or more conditions for handover to one of the one or more target cells have triggered, wherein the one target cell supports dual active protocol stack handover; and code for performing, based on the indication to use dual active protocol stack handover if possible in response to a handover, handover by the user equipment to the one target cell without releasing the source cell while accessing the one target cell.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above. It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

3GPP third generation partnership project
5G fifth generation
5GC 5G core network
AMF access and mobility management function
CHO conditional handover
config configuration
CU central unit
DAPS dual active protocol stack
DRB data radio bearer
DL downlink
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
HO handover
HOF handover failure
I/F interface
LTE long term evolution
MAC medium access control
MME mobility management entity
ng or NG next generation
ng-eNB or NG-eNB next generation eNB
NR new radio
N/W or NW network
PDCP packet data convergence protocol
PHY physical layer
PRACH physical RACH
RACH random access channel RAN radio access network
Rel release
RLC radio link control
RLF radio link failure
RRH remote radio head
RRC radio resource control
RSRP reference signal received power
RSRQ reference signal received quality
RU radio unit
Rx receiver
SDAP service data adaptation protocol
SDU service data unit
SGW or S-GW serving gateway
SMF session management function
SN sequence number
SRB signaling radio bearer
TS technical specification
Tx transmitter
UE user equipment (e.g., a wireless, typically mobile device)
UL uplink
UPF user plane function

The invention claimed is:

1. An apparatus, comprising:
one or more processors; and
one or more memories including computer program code, wherein the one or more memories and the computer program code are configured, with the one or more processors, to cause the apparatus at least to:
receive, from a source cell, a configuration for conditional handover for one or more target cells,
wherein at least one of the one or more target cells supports dual active protocol stack handover;
determine that one of a radio link failure or a handover failure has occurred;
select, using at least the configuration, one of the one or more target cells for a handover, wherein the selecting of the target cell to use for a handover further comprises:
skipping any selected cells that are configured with both conditional handover and dual active protocol stack handover;
selecting a target cell that has no configuration for dual active protocol stack handover by selecting another suitable cell until the target cell that has no configuration for dual active protocol stack handover is selected; and
perform a process for handover of the apparatus to the selected target cell by:
sending to the selected target cell a message comprising an indication of a conditional handover failure;
receiving, from the selected target cell, a new radio resource configuration that allows handover to the selected target cell without using dual active protocol stack handover; and
executing the conditional handover to the selected target cell without a dual active protocol stack handover to the selected target cell.

2. A system comprising:
an apparatus;
one or more processors; and
one or more memories including computer program code, wherein the one or more memories and the computer program code are configured, with the one or more processors, to cause the apparatus at least to:
receive, from a source cell, a configuration for conditional handover for one or more target cells,
wherein at least one of the one or more target cells supports dual active protocol stack handover;
determine that one of a radio link failure or a handover failure has occurred;
select, using at least the configuration, one of the one or more target cells for a handover, wherein the selecting of the target cell to use for a handover further comprises:
skipping any selected cells that are configured with both conditional handover and dual active protocol stack handover;
selecting a target cell that has no configuration for dual active protocol stack handover by selecting another suitable cell until the target cell that has no configuration for dual active protocol stack handover is selected; and
perform a process for handover of the apparatus to the selected target cell by:
sending to the selected target cell a message comprising an indication of a conditional handover failure;
receiving, from the selected target cell, a new radio resource configuration that allows handover to the selected target cell without using dual active protocol stack handover; and
executing the conditional handover to the selected target cell without a dual active protocol stack handover to the selected target cell.

3. A method comprising:
receiving, by a user equipment from a source cell, a configuration for conditional handover for one or more target cells,
wherein at least one of the one or more target cells supports dual active protocol stack handover;
determining, by the user equipment, that one of a radio link failure or a handover failure has occurred;
selecting, by the user equipment using at least the configuration, one of the one or more target cells for a handover, wherein the selecting of the target cell to use for a handover further comprises:
skipping any selected cells that are configured with both conditional handover and dual active protocol stack handover;
selecting a target cell that has no configuration for dual active protocol stack handover by selecting another suitable cell until the target cell that has no configuration for dual active protocol stack handover is selected; and
performing, by the user equipment, a process for handover of the apparatus to the selected target cell by:
sending to the selected target cell a message comprising an indication of a conditional handover failure;
receiving, from the selected target cell, a new radio resource configuration that allows handover to the selected target cell without using dual active protocol stack handover; and
executing, by the user equipment, the conditional handover to the selected target cell without a dual active protocol stack handover to the selected target cell.

* * * * *